United States Patent
Park et al.

(10) Patent No.: US 11,153,520 B2
(45) Date of Patent: Oct. 19, 2021

(54) ELECTRONIC DEVICE INCLUDING CAMERA MODULE IN DISPLAY AND METHOD FOR COMPENSATING FOR IMAGE AROUND CAMERA MODULE

(71) Applicant: SAMSUNG ELECTRONICS CO., LTD., Suwon-si (KR)

(72) Inventors: Minyoung Park, Suwon-si (KR); Giwook Kim, Suwon-si (KR); Bona Lee, Suwon-si (KR); Jiwon Lee, Suwon-si (KR); Kwangtai Kim, Suwon-si (KR); Hochul Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/594,182

(22) Filed: Oct. 7, 2019

(65) Prior Publication Data

US 2020/0169680 A1 May 28, 2020

(30) Foreign Application Priority Data

Nov. 22, 2018 (KR) .................. 10-2018-0145695

(51) Int. Cl.
*H04N 5/369* (2011.01)
*H04N 5/225* (2006.01)
(Continued)

(52) U.S. Cl.
CPC ....... *H04N 5/36963* (2018.08); *H04N 5/2257* (2013.01); *H04N 5/23264* (2013.01); *H04N 5/372* (2013.01); *H04N 5/374* (2013.01)

(58) Field of Classification Search
None
See application file for complete search history.

(56) References Cited

U.S. PATENT DOCUMENTS 10,009,525 B2   6/2018   Mathew et al.
10,320,962 B1*  6/2019   Chang ................. G06F 3/147
(Continued)

FOREIGN PATENT DOCUMENTS

CN    106921767 A    7/2017
CN    108650343 A    10/2018
(Continued)

OTHER PUBLICATIONS

ZDNet; ZTE Axon 20 5G first take: World's first under display camera may offer glimpse of the future; Dec. 21, 2020; pp. 1-6 (Year: 2020).*

(Continued)

*Primary Examiner* — Cynthia Segura
(74) *Attorney, Agent, or Firm* — Nixon & Vanderhye P.C.

(57) ABSTRACT

Disclosed is an electronic device including a display configured to display a screen, a display driver circuit configured to receive video information to control the display to display the screen, a module comprising at least one of a camera or a sensor disposed in a first region of the display, and at least one processor operatively connected with the display driver circuit and the module, wherein the at least one processor or the display driver circuit is configured to control the electronic device to compensate for, based on a change in an image of the first region of the screen or a pixel value of the first region, the image displayed in the first region.

18 Claims, 13 Drawing Sheets

(51) Int. Cl.
*H04N 5/232* (2006.01)
*H04N 5/372* (2011.01)
*H04N 5/374* (2011.01)

(56) References Cited

U.S. PATENT DOCUMENTS

| | | | |
|---|---|---|---|
| 10,347,179 B2* | 7/2019 | Kim | G09G 3/3266 |
| 10,733,437 B2* | 8/2020 | Weller | H04N 9/04 |
| 2006/0279652 A1* | 12/2006 | Yang | H04M 1/0266 |
| | | | 348/333.01 |
| 2007/0002130 A1* | 1/2007 | Hartkop | H04N 7/141 |
| | | | 348/14.16 |
| 2007/0013802 A1* | 1/2007 | Yang Chen | H04N 5/2251 |
| | | | 348/333.01 |
| 2009/0009628 A1* | 1/2009 | Janicek | H04N 5/232 |
| | | | 348/231.99 |
| 2012/0258773 A1 | 10/2012 | Alvarez Rivera et al. | |
| 2014/0118591 A1* | 5/2014 | Maglaque | H04N 5/2621 |
| | | | 348/308 |
| 2017/0126979 A1* | 5/2017 | Evans, V | H04M 1/0264 |
| 2017/0287992 A1* | 10/2017 | Kwak | H04M 1/0264 |
| 2018/0046837 A1 | 2/2018 | Gozzini et al. | |
| 2018/0150942 A1* | 5/2018 | Zeng | H04N 5/367 |
| 2018/0184035 A1 | 6/2018 | Kim et al. | |
| 2018/0276466 A1* | 9/2018 | Weller | G09G 3/3413 |
| 2018/0316784 A1 | 11/2018 | Bao | |
| 2018/0329248 A1 | 11/2018 | Cho | |
| 2019/0130822 A1* | 5/2019 | Jung | H01L 27/32 |
| 2019/0280058 A1* | 9/2019 | Li | H01L 51/524 |

FOREIGN PATENT DOCUMENTS

| | | | |
|---|---|---|---|
| EP | 2 448 243 A2 | 5/2012 | |
| EP | 2 695 033 A1 | 2/2014 | |
| KR | 10-2008-0101165 | 11/2008 | |
| KR | 10-2017-0113066 | 10/2017 | |
| KR | 10-2018-0008238 | 1/2018 | |
| KR | 10-2018-0026288 | 3/2018 | |
| WO | WO 2012/138579 | 10/2012 | |
| WO | WO-2017164680 A1 * | 9/2017 | G09G 3/3208 |

OTHER PUBLICATIONS

International Search Report and Written Opinion dated Jan. 29, 2020 in counterpart International Patent Application No. PCT/KR2019/013002.

Extended European Search Report dated Jul. 20, 2021 for EP Application No. 19887853,0.

* cited by examiner

ELECTRONIC DEVICE INCLUDING CAMERA MODULE IN DISPLAY AND METHOD FOR COMPENSATING FOR IMAGE AROUND CAMERA MODULE

CROSS-REFERENCE TO RELATED APPLICATION

This application is based on and claims priority under 35 U.S.C. § 119 to Korean Patent Application No. 10-2018-0145695, filed on Nov. 22, 2018, in the Korean Intellectual Property Office, the disclosure of which is incorporated by reference herein its entirety.

BACKGROUND

1. Field

The disclosure relates to an electronic device including a camera module in a display and a method for compensating for an image around the camera module.

2. Description of Related Art

In order to increase a region for displaying a screen on a front surface of an electronic device such as a smartphone, an area of a display disposed on the front surface of the electronic device is increased. As the area of the display increases, the display and a camera module or a sensor module disposed at an edge of the front surface of the electronic device are arranged to be adjacent to each other.

The electronic device may dispose the camera module or the sensor module in a notch. For example, the notch may be defined in an upper center portion of the front surface edge of the electronic device. The notch may be exposed through the front surface of the electronic device together with a black matrix (BM).

When a notch is defined in a front surface of an electronic device, the notch covers a screen displayed on a display. When the notch covers the screen, the notch is viewed as a black portion, so that it is not easy to overcome heterogeneity between the screen and the notch.

In order to use the display as wide as possible, the display may be extended to include a camera module or a sensor module disposed on an edge of the front surface of the electronic device. When the display includes the camera module or the sensor module, the screen displayed on the display and the camera module or the sensor module may be viewed together. When the screen and the camera module or the sensor module are viewed together, viewing of the screen may be disturbed.

The above information is presented as background information only to assist with an understanding of the disclosure. No determination has been made, and no assertion is made, as to whether any of the above might be applicable as prior art with regard to the disclosure.

SUMMARY

Embodiments of the disclosure provide a method for compensating for an image displayed around the camera module or the sensor module such that the disturbance of the viewing the screen by the camera module or the sensor module is reduced in the electronic device having the display including the camera module or the sensor module.

Aspects of the disclosure address at least the above-mentioned problems and/or disadvantages and provide at least the advantages described below. Accordingly, an example aspect of the disclosure is to provide an electronic device including a display configured to display a screen, a display driver circuit configured to receive video information to control the display to display the screen, a module comprising at least one of camera circuitry or sensing circuitry disposed in a first region of the display, and at least one processor operatively connected with the display driver circuit and the module, wherein the at least one processor or the display driver circuit is configured to control the electronic device to compensate for, based on a change in an image of the first region of the screen or a pixel value of the first region, the image displayed in the first region.

Accordingly, another example aspect of the disclosure is to provide a method for compensating for an image around a camera module of an electronic device in which the camera module is disposed in a display configured to display a screen including executing an image-related program, extracting a pixel value of a first region around the camera module as a first value, determining whether a change in the image is detected, extracting a pixel value of the first region after the change in the image as a second value based on the change in the image being detected, determining whether a difference between the first value and the second value is greater than or equal to a threshold value, and compensating for the image of the first region based on the difference between the first value and the second value being greater than or equal to the threshold value.

Still another example aspect of the disclosure is to provide an electronic device including a display configured to display a screen, a display driver circuit configured to receive video information to control the display to display the screen, a camera module comprising a camera disposed in a first region of the display, and at least one processor operatively connected with the display driver circuit and the camera module, wherein the at least one processor or the display driver circuit is configured to compensate for the first region to reduce a degree of visibility of the camera module.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

In the description of the drawings, the same or similar reference numerals may be used for the same or similar components.

DETAILED DESCRIPTION

Hereinafter, various example embodiments of the disclosure will be described with reference to accompanying drawings. The various example embodiments of the disclosure used herein are not intended to limit the disclosure to specific embodiments, and it should be understood that the embodiments include modifications, equivalents, and/or alternatives on the corresponding embodiments described herein.

Figure 1:
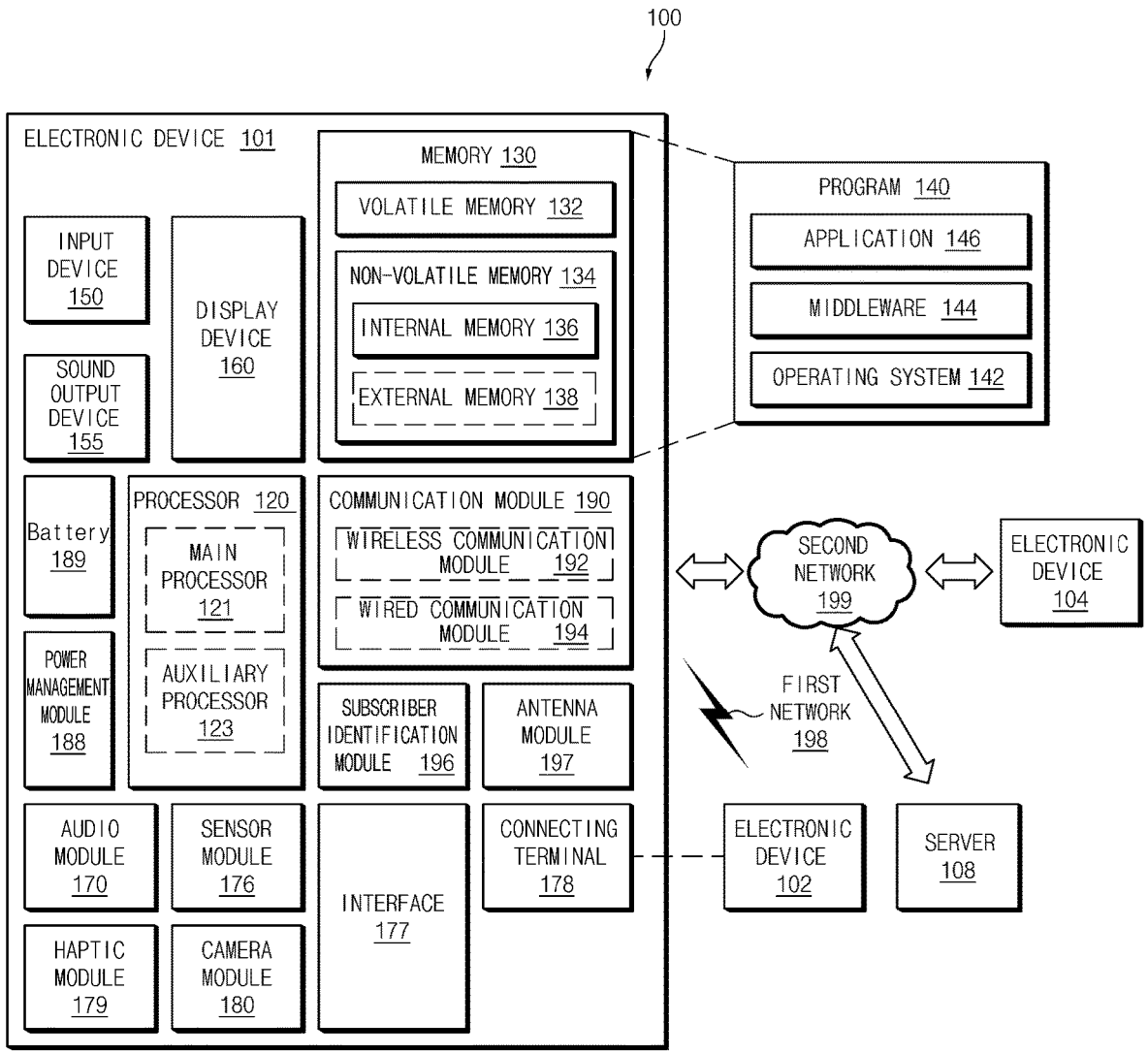
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an example embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
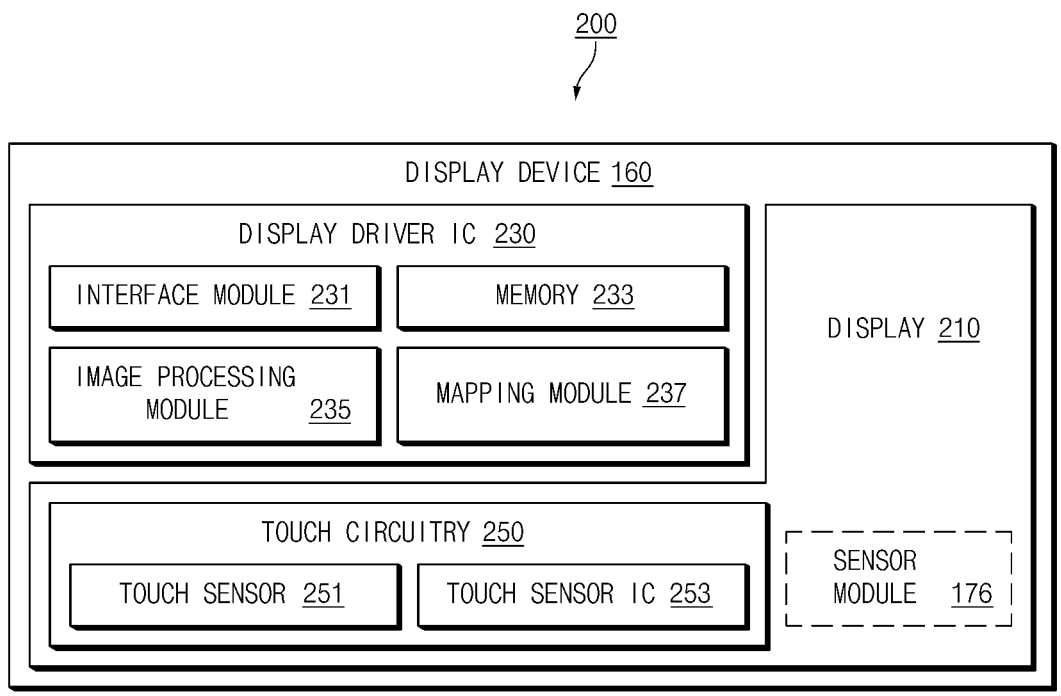
FIG. 2 is a block diagram illustrating an example display device according to various embodiments.

FIG. 2 is a block diagram 200 illustrating the display device 160 according to various embodiments. Referring to FIG. 2, the display device 160 may include a display 210 and a display driver integrated circuit (DDI) 230 to control the display 210. The DDI 230 may include an interface module 231, memory 233 (e.g., buffer memory), an image processing module 235, or a mapping module 237. The DDI 230 may receive image information that contains image data or an image control signal corresponding to a command to control the image data from another component of the electronic device 101 via the interface module 231. For example, according to an embodiment, the image information may be received from the processor 120 (e.g., the main processor 121 (e.g., an application processor)) or the auxiliary processor 123 (e.g., a graphics processing unit) operated independently from the function of the main processor 121. The DDI 230 may communicate, for example, with touch circuitry 150 or the sensor module 176 via the interface module 231. The DDI 230 may also store at least part of the received image information in the memory 233, for example, on a frame by frame basis.

The image processing module 235 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 210.

The mapping module 237 may generate a voltage value or a current value corresponding to the image data pre-processed or post-processed by the image processing module 235. According to an embodiment, the generating of the voltage value or current value may be performed, for example, based at least in part on one or more attributes of the pixels (e.g., an array, such as an RGB stripe or a pentile structure, of the pixels, or the size of each subpixel). At least some pixels of the display 210 may be driven, for example, based at least in part on the voltage value or the current value such that visual information (e.g., a text, an image, or an icon) corresponding to the image data may be displayed via the display 210.

According to an embodiment, the display device 160 may further include the touch circuitry 250. The touch circuitry 250 may include a touch sensor 251 and a touch sensor IC 253 to control the touch sensor 251. The touch sensor IC 253 may control the touch sensor 251 to sense a touch input or a hovering input with respect to a certain position on the display 210. To achieve this, for example, the touch sensor 251 may detect (e.g., measure) a change in a signal (e.g., a voltage, a quantity of light, a resistance, or a quantity of one or more electric charges) corresponding to the certain position on the display 210. The touch circuitry 250 may provide input information (e.g., a position, an area, a pressure, or a time) indicative of the touch input or the hovering input detected via the touch sensor 251 to the processor 120. According to an embodiment, at least part (e.g., the touch sensor IC 253) of the touch circuitry 250 may be formed as part of the display 210 or the DDI 230, or as part of another component (e.g., the auxiliary processor 123) disposed outside the display device 160.

According to an embodiment, the display device 160 may further include at least one sensor (e.g., a fingerprint sensor, an iris sensor, a pressure sensor, or an illuminance sensor) of the sensor module 176 or a control circuit for the at least one sensor. In such a case, the at least one sensor or the control circuit for the at least one sensor may be embedded in one portion of a component (e.g., the display 210, the DDI 230, or the touch circuitry 150)) of the display device 160. For example, when the sensor module 176 embedded in the display device 160 includes a biometric sensor (e.g., a fingerprint sensor), the biometric sensor may obtain biometric information (e.g., a fingerprint image) corresponding to a touch input received via a portion of the display 210. As another example, when the sensor module 176 embedded in the display device 160 includes a pressure sensor, the pressure sensor may obtain pressure information corresponding to a touch input received via a partial or whole area of the display 210. According to an embodiment, the touch sensor 251 or the sensor module 176 may be disposed between pixels in a pixel layer of the display 210, or over or under the pixel layer.

Figure 3:
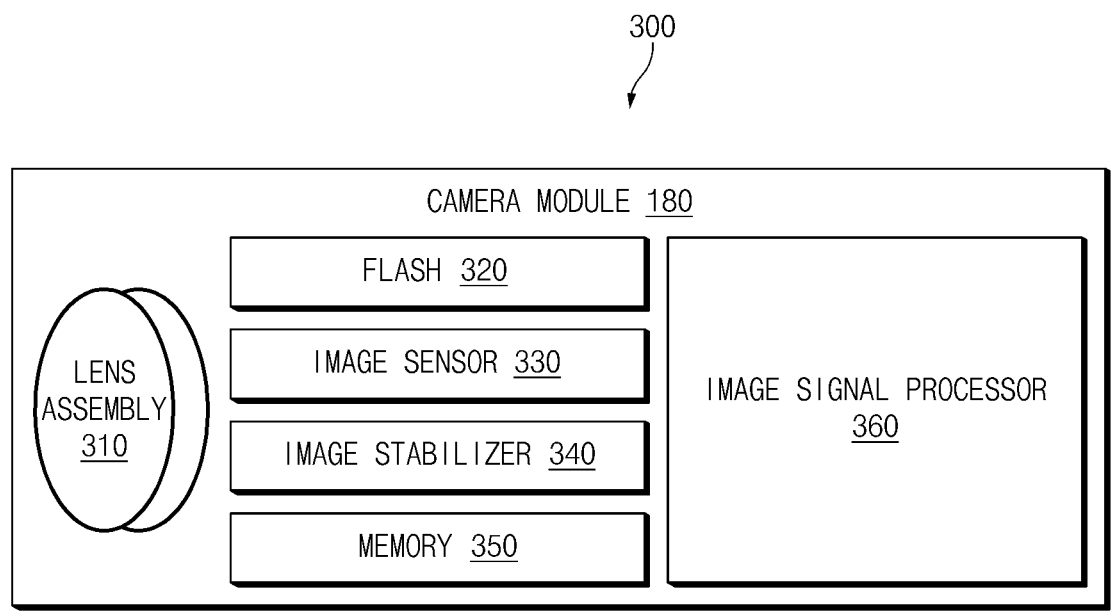
FIG. 3 is a block diagram illustrating an example camera module according to various embodiments.
Figure 4D:
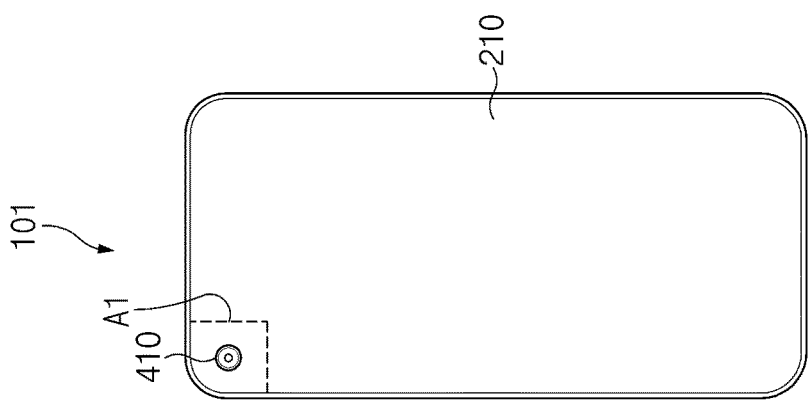
FIGS. 4A, 4B, 4C and 4D are diagrams illustrating an example display and an example module of an electronic device according to various embodiments.
Figure 4C:
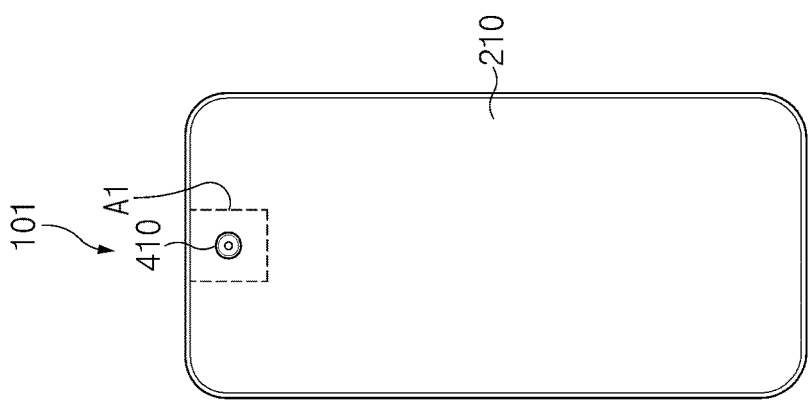
Figure 4B:
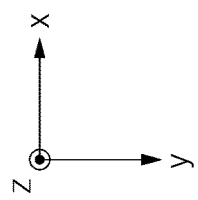
Figure 4B:
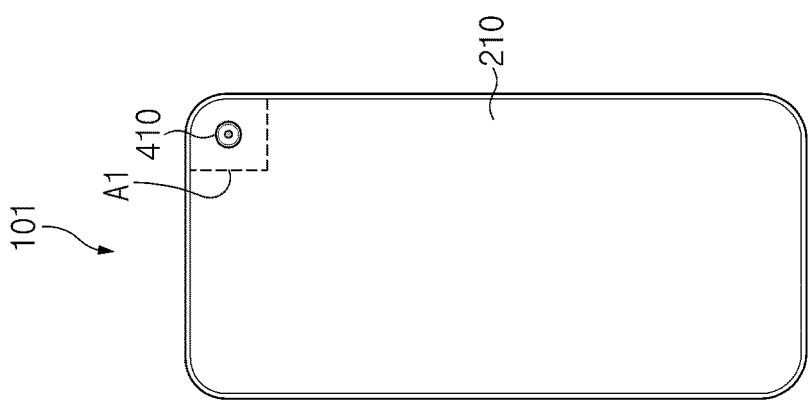
Figure 4A:
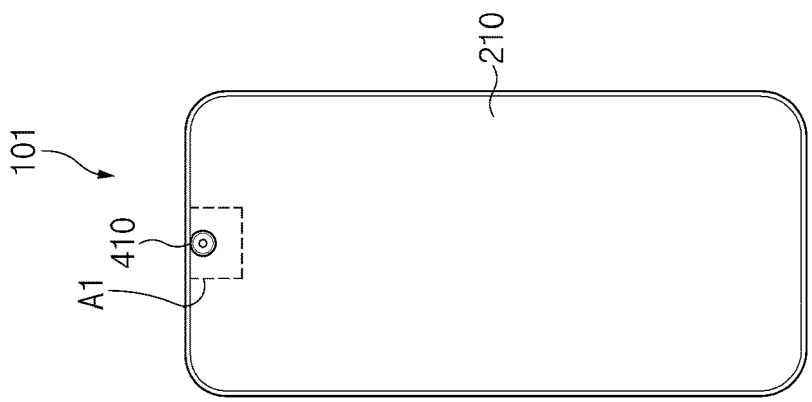

FIG. 3 is a block diagram 300 illustrating the camera module 180 according to various embodiments. Referring to FIG. 3, the camera module 180 may include a lens assembly 310, a flash 320, an image sensor 330, an image stabilizer 340, memory 350 (e.g., buffer memory), or an image signal processor 360. The lens assembly 310 may collect light emitted or reflected from an object whose image is to be taken. The lens assembly 310 may include one or more lenses. According to an embodiment, the camera module 180 may include a plurality of lens assemblies 310. In such a case, the camera module 180 may form, for example, a dual camera, a 360-degree camera, or a spherical camera. Some of the plurality of lens assemblies 310 may have the same lens attribute (e.g., view angle, focal length, auto-focusing, f number, or optical zoom), or at least one lens assembly may have one or more lens attributes different from those of another lens assembly. The lens assembly 310 may include, for example, a wide-angle lens or a telephoto lens.

The flash 320 may emit light that is used to reinforce light reflected from an object. According to an embodiment, the flash 320 may include one or more light emitting diodes (LEDs) (e.g., a red-green-blue (RGB) LED, a white LED, an infrared (IR) LED, or an ultraviolet (UV) LED) or a xenon lamp. The image sensor 330 may obtain an image corresponding to an object by converting light emitted or reflected from the object and transmitted via the lens assembly 310 into an electrical signal. According to an embodiment, the image sensor 330 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 330 may be implemented using, for example, a charged coupled device (CCD) sensor or a complementary metal oxide semiconductor (CMOS) sensor.

The image stabilizer 340 may move the image sensor 330 or at least one lens included in the lens assembly 310 in a particular direction, or control an operational attribute (e.g., adjust the read-out timing) of the image sensor 330 in response to the movement of the camera module 180 or the electronic device 101 including the camera module 180. This allows compensating for at least part of a negative effect (e.g., image blurring) by the movement on an image being captured. According to an embodiment, the image stabilizer 340 may sense such a movement by the camera module 180 or the electronic device 101 using a gyro sensor (not shown) or an acceleration sensor (not shown) disposed inside or outside the camera module 180. According to an embodiment, the image stabilizer 340 may be implemented, for example, as an optical image stabilizer.

The memory 350 may store, at least temporarily, at least part of an image obtained via the image sensor 330 for a subsequent image processing task. For example, if image capturing is delayed due to shutter lag or multiple images are quickly captured, a raw image obtained (e.g., a Bayer-patterned image, a high-resolution image) may be stored in the memory 350, and its corresponding copy image (e.g., a low-resolution image) may be previewed via the display device 160. Thereafter, if a specified condition is met (e.g., by a user's input or system command), at least part of the raw image stored in the memory 350 may be obtained and processed, for example, by the image signal processor 360. According to an embodiment, the memory 350 may be configured as at least part of the memory 130 or as a separate memory that is operated independently from the memory 130.

The image signal processor 360 may perform one or more image processing with respect to an image obtained via the image sensor 330 or an image stored in the memory 350. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 360 may perform control (e.g., exposure time control or read-out timing control) with respect to at least one (e.g., the image sensor 330) of the components included in the camera module 180. An image processed by the image signal processor 360 may be stored back in the memory 350 for further processing, or may be provided to an external component (e.g., the memory 130, the display device 160, the electronic device 102, the electronic device 104, or the server 108) outside the camera module 180. According to an embodiment, the image signal processor 360 may be configured as at least part of the processor 120, or as a separate processor that is operated independently from the processor 120. If the image signal processor 360 is configured as a separate processor from the processor 120, at least one image processed by the image signal processor 360 may be displayed, by the processor 120, via the display device 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

FIGS. 4A, 4B, 4C and 4D are diagrams illustrating examples of the display 210 and a module 410 of the electronic device 101 according to various embodiments.

In an example embodiment, the display 210 may be disposed on a front face of the electronic device 101. The front surface of the display 210 may be disposed in a Z-axis direction. The display 210 may be the full display 210 disposed on the entire front surface region of the electronic device 101 except for a side surface edge portion connected to a back plate of the electronic device 101.

In an example embodiment, the display 210 may display a screen. When the electronic device 101 executes a program such as an application, the display 210 may display an execution screen of the program. A region displaying a screen of the front surface region of the electronic device 101 may be referred to as a display region.

In an example embodiment, the module 410 may be included in the display 210. The module 410 may, for example, and without limitation, be the camera module 180 and/or the sensor module 176. The module 410 may be disposed in the display region. Accordingly, the electronic device 101 including the module 410 disposed at a position overlapping with at least a portion of the full display 210 may be implemented.

In an example embodiment, the module 410 may be disposed at an edge of the display 210. For example, the module 410 may be disposed at a top-left portion of the display 210 with respect to an X-Y plane defined by an X-axis and a Y-axis as illustrated, for example, in FIG. 4A. In another example, the module 410 may be disposed at a top-center portion of the display 210 as illustrated, for example, in FIG. 4B. In still another example, the module 410 may be disposed at a top-right portion of the display 210 as illustrated, for example, in FIG. 4C. In yet another example, the module 410 may be disposed such that at least a portion thereof is in contact with a non-display region, which is a region other than the display region of the display 210, or a bezel, as illustrated, for example, in FIG. 4D.

In FIGS. 4A, 4B, 4C and 4D, a shape of the module 410 on the display 210 is illustrated as a circle. However, the shape of the module 410 is not limited to the circle. The module 410 may have a shape such as an oval or polygon. In addition, FIGS. 4A, 4B, 4C and 4D illustrate examples in which one module 410 is disposed on the display 210. However, the number of modules 410 is not limited, and at least one module 410 may be disposed on the display 210.

In an example embodiment, the display 210 may include a first region A1. The first region A1 may be a portion around the module 410 of the display region displaying the screen on the display 210. The first region A1 may be a region adjacent to the module 410 with respect to the X-Y plane. A region in the first region A1 other than the region at which the module 410 is disposed to overlap with the camera module 180 may display an image included in the screen. The image displayed at the first region A1 may be independent of the position where the module 410 is disposed. Except that the image is cut by the module 410 itself, the display 210 may uniformly display the screen including the image of the first region A1 throughout the display region.

In an example embodiment, the electronic device 101 may punch a portion of the first region A1 of the display 210 to be penetrated, thereby implementing the punched display 210. The electronic device 101 may apply the punched display 210 to dispose the module 410 in the first region A1. Accordingly, the electronic device 101 may dispose the module 410 in the first region A1 instead of in a notch, thereby excluding the notch from the front surface edge of the display 210.

Figure 5A:
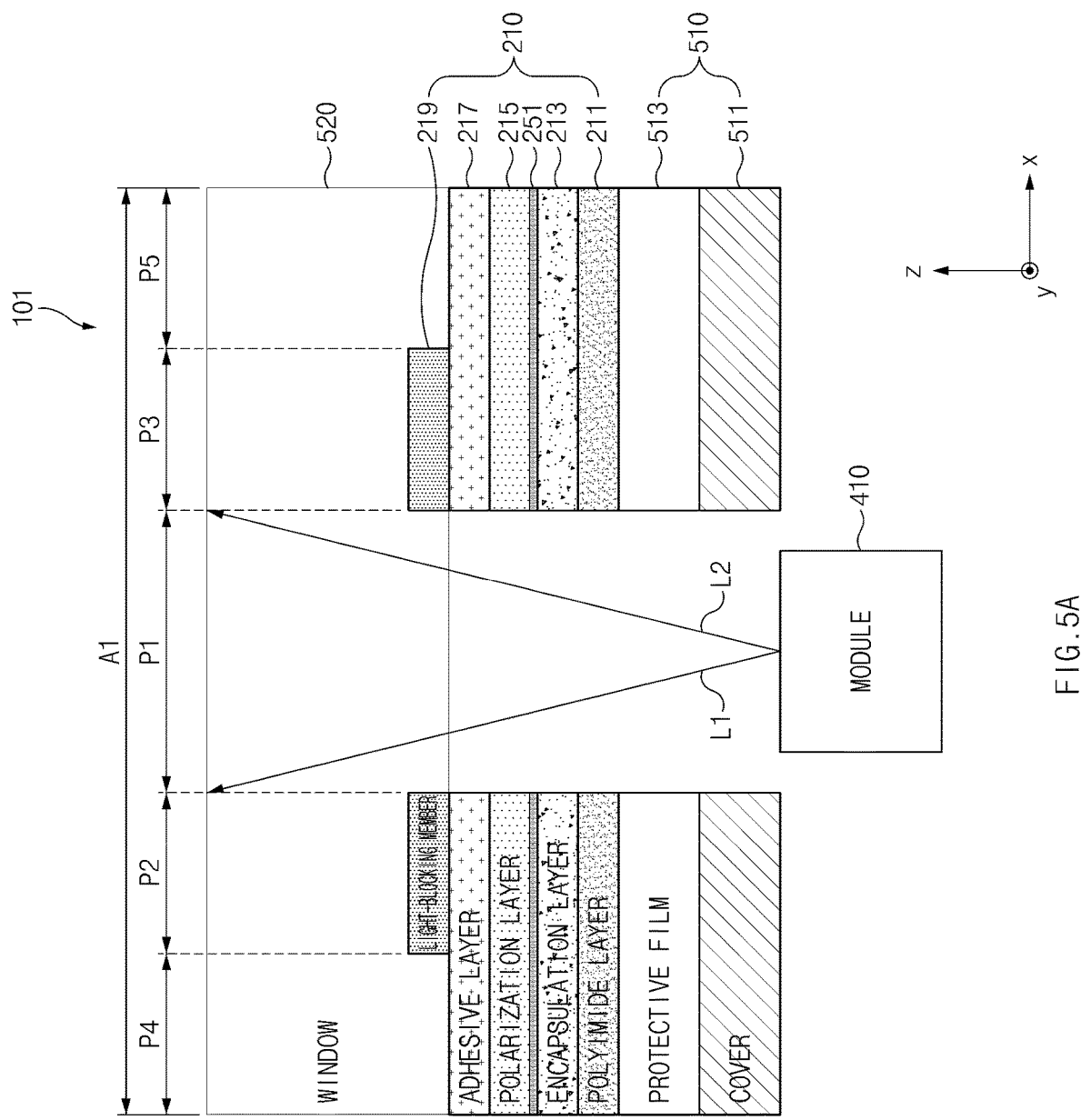
FIGS. 5A, 5B and 5C are cross-sectional views illustrating an example electronic device according to an embodiment.
Figure 5B:
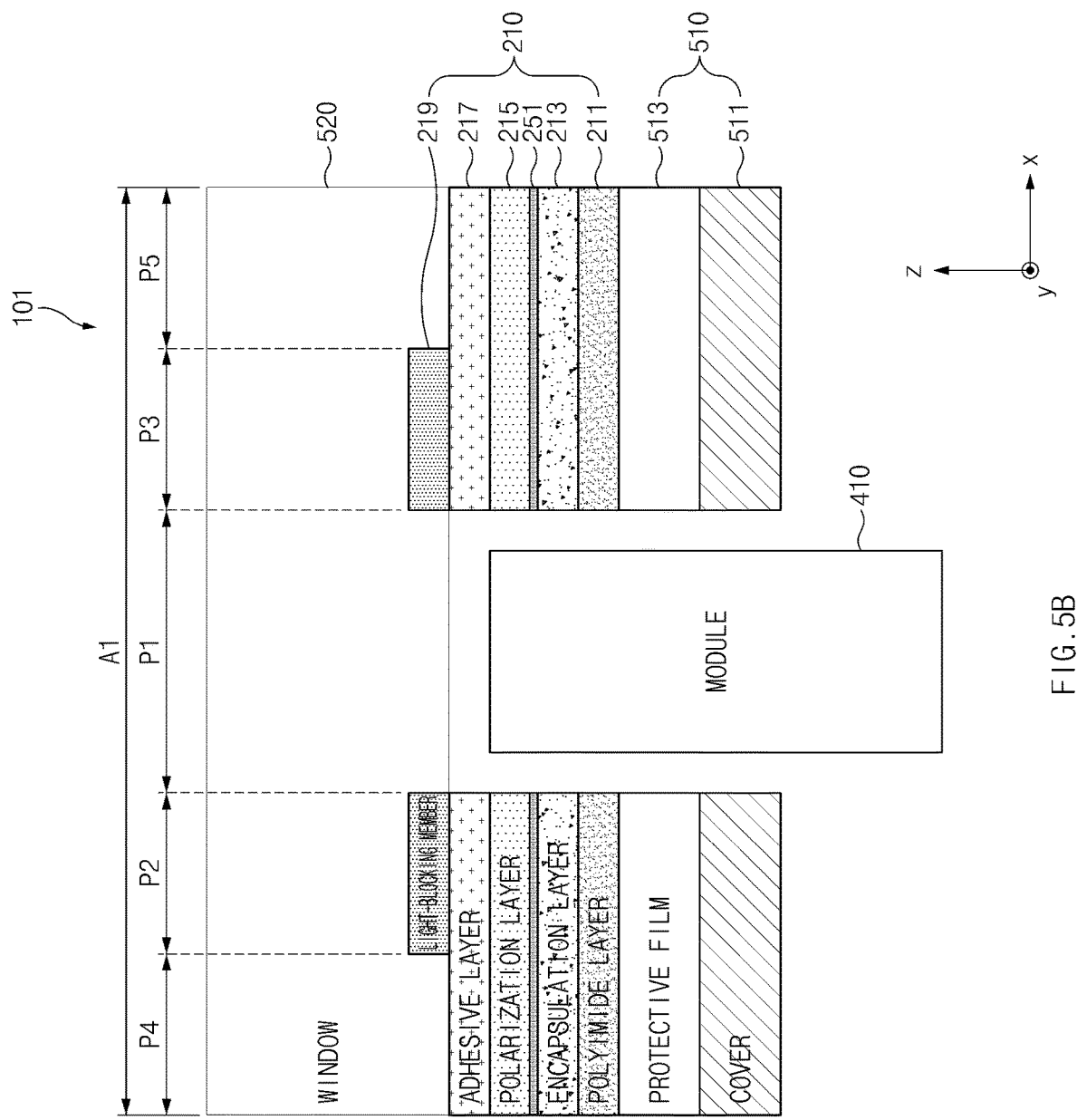
Figure 5C:
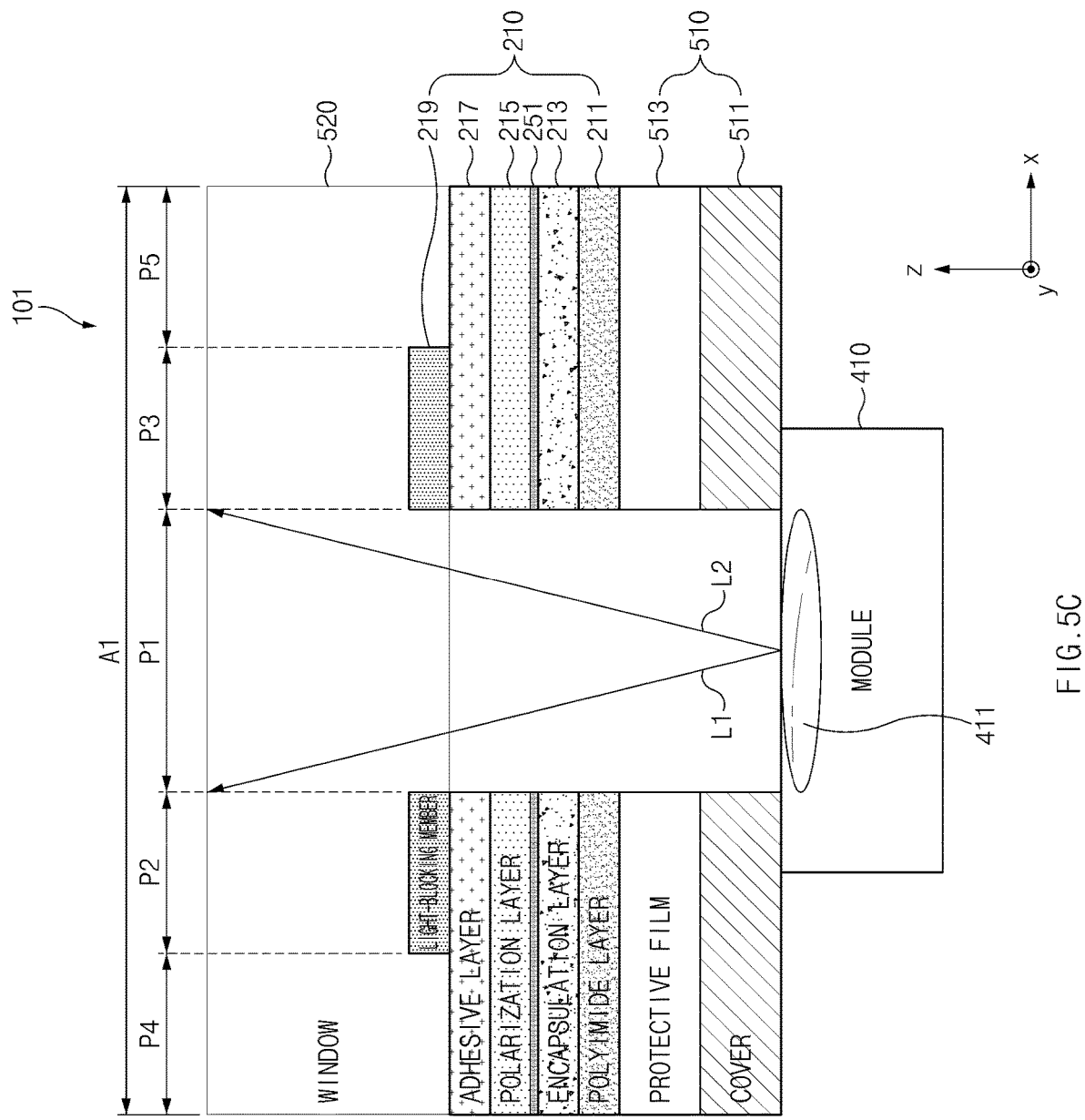

FIGS. 5A, 5B and 5C are cross-sectional views of the first region A1 of the electronic device 101 according to an embodiment. The electronic device 101 may include the module 410, a cover panel 510, the display 210, and a window 520 in the first region A1.

In an example embodiment, the module 410 may be disposed adjacent to a lower portion of the electronic device with respect to a Z-axis direction. For example, as shown in FIG. 5A, the module 410 may be disposed below the cover panel 510, the display 210, and the window 520. In another example, as shown in FIG. 5B, the module 410 may penetrate the display 210. In this example, the display 210 may accommodate therein at least a portion of the module 410. The module 410 may be disposed in a first portion P1 of the first region A1. The first portion P1 may be a portion in which the cover panel 510 and the display 210 are not disposed, and only the window 520 is disposed. As described above, the module 410 may be the camera module 180. The camera module 180 may photograph the outside through the first portion P1. The camera module 180 may photograph an external region within a viewing angle defined, for example, by a plurality of paths L1 and L2.

In an example embodiment, the cover panel 510 may be disposed above the module 410 with respect to the Z-axis direction. The cover panel 510 may be disposed under the display 210.

In an example embodiment, the cover panel may include, for example, and without limitation, at least one of a black layer, a support layer, a heat-dissipation layer, or the like.

In an example embodiment, the black layer may block at least one of light received through the display 210, for example, light generated from the display 210 or light incident from the outside. In an example, the black layer may be formed to have an uneven surface.

In an example embodiment, the support layer may relieve pressure from the outside. For example, the support layer may be formed of an elastic member (e.g., a sponge). The cover panel 510 may protect the display 210. The cover panel 510 may include, for example, at least one of a cover 511 and/or a protective film 513.

In an example embodiment, the cover 511 and/or the protective film 513 may be sequentially stacked with respect to the Z-axis direction. The cover 511 may protect the display 210 from an impact applied from the lower portion of the electronic device 101. The protective film 513 may be disposed on the cover 511 to absorb the impact received by the cover 511.

In an example embodiment, the heat-dissipation layer may dissipate a heat generated in a display panel to the outside. For example, the heat-dissipation layer may comprise at least one of copper (Cu) or graphite.

In an example embodiment, the display 210 may be disposed on the cover panel 510 with respect to the Z-axis direction. The display 210 may display the screen in an upward direction. The display 210 may include, for example, and without limitation, a polyimide (PI) layer 211, an encapsulation layer 213, the touch sensor 251, a polarization (POL) layer 215, an adhesive layer 217, and an opaque member 219.

In an example embodiment, the polyimide layer 211 may be disposed on the protective film 513. The polyimide layer 211 may have flexibility. The display 210 may be implemented as a flexible panel using the polyimide layer 211. A plurality of pixels for displaying the screen in the upward direction may be arranged in an upper portion of the polyimide layer 211.

In an example embodiment, the encapsulation layer 213 may be disposed on the polyimide layer 211. The encapsulation layer 213 may cover the plurality of pixels. The encapsulation layer 213 may protect the plurality of pixels from foreign substances such as moisture or oxygen. The encapsulation layer 213 may be implemented by, for example, a thin film encapsulation (TFE).

In an example embodiment, the touch sensor 251 may be disposed on the encapsulation layer 213. The touch sensor 251 may detect a touch input of the user. The touch sensor 251 may, for example, be a touch screen panel sensor (TSP sensor).

In an example embodiment, the polarization layer 215 may be disposed on the touch sensor 251. The polarization layer 215 may polarize light emitted from the pixel and directed upward to display the screen. The polarization layer 215 may reduce reflection of the light incident from the outside toward the display 210.

In an example embodiment, the adhesive layer 217 may be disposed on the polarization layer 215. The adhesive layer 217 may attach the polarization layer 215 and the opaque member 219 with each other. The adhesive layer 217 may attach the polarization layer 215 and the window 520 with each other. The adhesive layer 217 may be comprised, for example, of optical clear adhesive (OCA).

In an example embodiment, the opaque member 219 may be disposed on the adhesive layer 217. For example, the opaque member 219 may be disposed on at least a portion of the display 210. However, the opaque member 219 is not limited thereto, and when a wiring that drives the display 210 or a touch screen panel wiring is a non-transparent metal wiring such as a metal mesh, the wirings may be used as the opaque member 219 without disposing the opaque member 219. For example, the opaque member 219 may cover, among second to fifth portions P2 to P5 on which the display 210 is disposed, a second portion P2 and a third portion P3. The second portion P2 and the third portion P3 may, for example, be portions in which the pixels are not arranged. For example, the second portion P2 and the third portion P3 may be portions at which the wirings for driving the display 210 are arranged. A fourth portion P4 and a fifth portion P5 may be portions in which the plurality of pixels are arranged. For example, the opaque member 219 may be a black matrix (BM).

In an example embodiment, the window 520 may be disposed on the display 210. The window 520 may be integrally formed in the first region A1. The window 520 may be formed of a transparent material to transmit light. The window 520 may protect the front surface of the display 210.

In an example embodiment, the electronic device 101 may apply the punched display 210, which is the display 210 at least a portion of which is penetrated to dispose the module 410 on the first portion P1 without disposing in the second portion P2 and the third portion P3 on which the opaque member 219 is disposed, as shown in FIG. 5A and FIG. 5B. The electronic device 101 may reduce an area of the opaque member 219 disposed on the front surface thereof and increase areas of the fourth portion P4 and the fifth portion P5 displaying the screen on the display 210.

In an example embodiment, the electronic device 101 may apply the punched display 210, which is the display 210 at least a portion of which is penetrated to dispose the module 410 overlap not only the first portion P1 but also the second portion P2 and the third portion P3 and dispose a lens 411 of the module 410 on the first portion P1, as shown in FIG. 5C. The electronic device 101 may dispose the lens 411 not to be covered by the opaque member 219 disposed on the front surface thereof and dispose the module 410 itself to be up to the second portion P2 and the third portion P3 to increase a degree of freedom of a design, simultaneously.

In an example embodiment, the cases in which the module 410 is included in the display 210 are illustrated associated with FIGS. 4A, 4B, 4C and 4D, and FIGS. 5A, 5B and 5C. The display 210 may include the module 410 which is hardware or a physical component disposed on the front surface of the electronic device 101. For example, the module 410 may, for example, be the camera module 180 or the sensor module 176.

In an example embodiment, the module 410 which is the component positioned on the front surface of the electronic device 101 may be viewed together when the screen of the display 210 is viewed. For example, the camera module 180 or the sensor module 176 may be viewed together with the screen. Hereinafter, an example in which the module 410 is the camera module 180 will be described by way of example, but the disclosure is not limited thereto. In the first region A1 including the camera module 180, the electronic device 101 may compensate for an image around the camera module 180 such that the camera module 180 may be matched with the surrounding image based on a situation.

Figure 6:
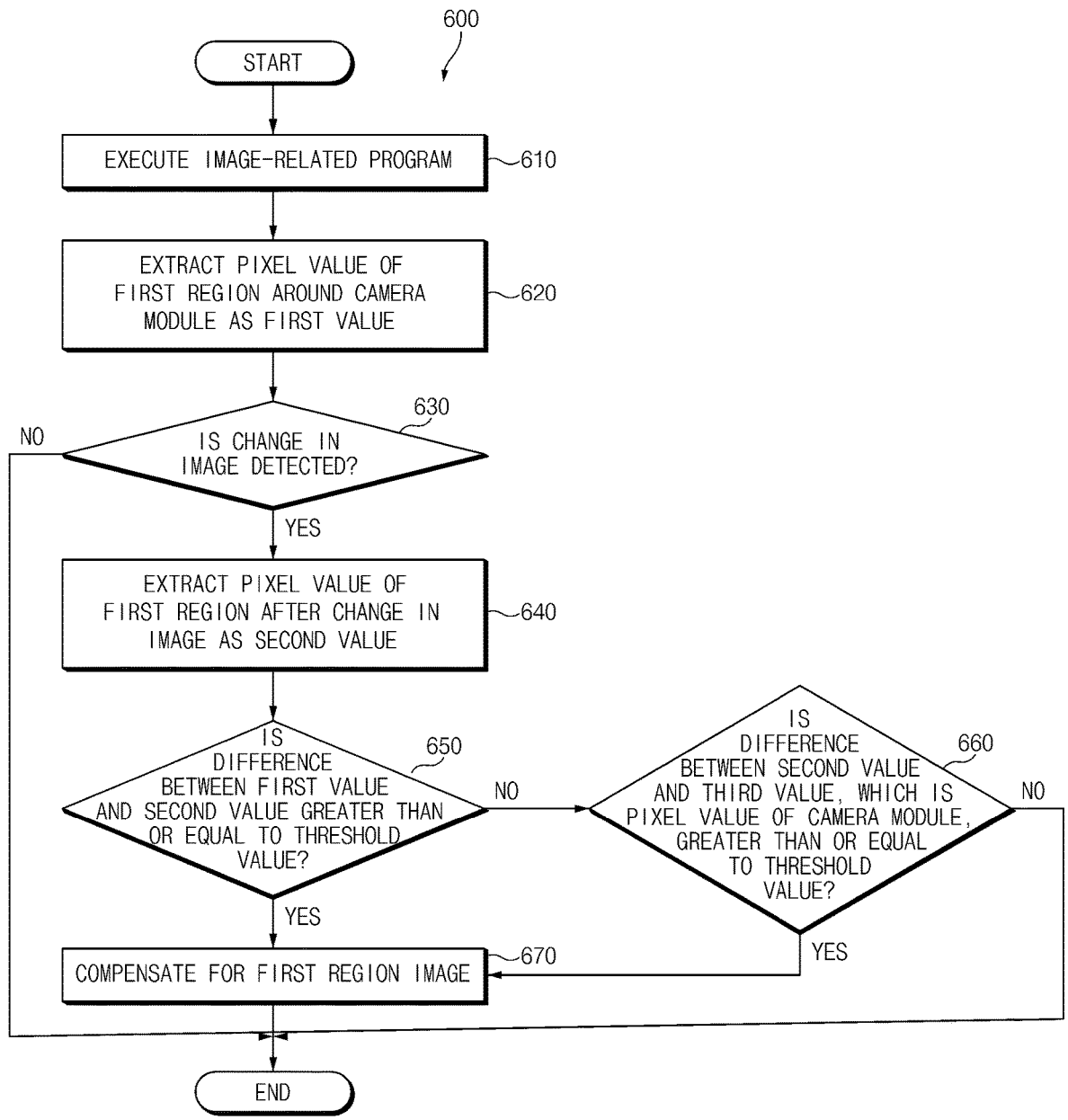
FIG. 6 is a flowchart illustrating an example method for compensating for an image around a camera module of an electronic device according to an embodiment.

FIG. 6 is a flowchart 600 illustrating an example method for compensating for the image around the camera module 180 of the electronic device 101 according to an embodiment.

The electronic device 101 according to an embodiment may execute an image-related program in operation 610. The image-related program may, for example, be a program or an application that displays a screen including a plurality of images on the display 210. For example, the image-related program may be an application such as, for example, and without limitation a gallery, a video, a social network service (SNS), a web page, a camera, or a YouTube™. The processor 120 of the electronic device 101 may execute the image-related program in response to an input, by the user, of selecting an icon set to execute the image-related program.

In operation 620, the electronic device 101 according to an embodiment may extract a pixel value of the first region A1 around the camera module 180 as a first value. The pixel value may, for example, be a value corresponding to output of the pixels arranged in the first region A1. The pixel value may be a value related to properties of the image displayed in the first region A1 of the display 210. For example, the pixel value may, for example, and without limitation, be a brightness value of the image displayed in the first region A1, a saturation value of the image displayed in the first region A1, a color value of the image displayed in the first region A1, or the like. The electronic device 101 may analyze the plurality of pixels arranged in the first region A1. The electronic device 101 may extract the pixel value of the first region A1 as the first value and temporarily store the first value in the memory 130. The operation 620 may be performed by the processor 120 or the DDI 230.

According to an embodiment, the electronic device 101 may determine whether a change in an image is detected in operation 630. The change in the image may refer, for example, to a change in the image displayed in the first region A1. The electronic device 101 may detect the change in the image displayed in the first region A1. The operation 630 may be performed by the processor 120 or the DDI 230.

In an example embodiment, the change in the image may occur due to a change in the screen displayed on the display 210 by the user. For example, the user may generate the change in the image by performing a zoom in function of enlarging some regions of the screen or some images displayed on the display 210. In another example, the user may generate the change of the image by performing a zoom out function of reducing some regions of the screen or some images displayed on the display 210. When the screen displayed on the display 210 changes due to the user input, the processor 120 of the electronic device 101 may determine that the image displayed on the first region A1 has changed.

In an example embodiment, the change in the image may be caused by a change in the pixel value of the image displayed in the first region A1 by the image-related program. For example, when a screen displayed on the display 210 in the video application is a video in which a background is changed from a dark background to a light background, a pixel value of an image displayed in the background may change. Accordingly, the change in the image displayed in the first region A1 may occur. When the pixel value of the image displayed in the first region A1 changes by the image-related program, the processor 120 of the electronic device 101 may determine that the image displayed in the first region A1 has changed.

In an example embodiment, the processor 120 may proceed to operation 640 when the change in the image is detected. When the change in the image is not detected, the processor 120 may display a screen in which the image of the first region A1 is not compensated on the display 210.

When the change in the image is detected, in operation 640, the electronic device 101 according to an example embodiment may extract a pixel value of the first region A1 after the change in the image as a second value. The second value may be a value related to properties of the image displayed in the first region A1 of the display 210 after the change in the image. For example, the pixel value may be a brightness value, a saturation value, or a color value of the image displayed in the first region A1 after the change in the image. The electronic device 101 may analyze a plurality of pixels arranged in the first region A1 after the change in the image. The operation 640 may be performed by the processor 120 or the DDI 230.

In operation 650, the electronic device 101 according to an example embodiment may determine whether a difference between the first value and the second value is greater than or equal to a threshold value. The threshold value may, for example, be a pixel value that may view the change in the image. The threshold value may be set to a pixel value that disturbs a view of the screen by the camera module 180 after the change in the image. The electronic device 101 may compare the first value temporarily stored in the memory 130 before the change in the image and the second value after the change in the image. For example, the electronic device 101 may determine whether a difference between the brightness or the saturation values of the first region A1 before and after zooming the image is greater than or equal to a predefined threshold value. The operation 650 may be performed by the processor 120 or the DDI 230.

In an example embodiment, when the difference between the first value and the second value is greater than or equal to the threshold value, the electronic device 101 may proceed to operation 670. When the difference between the first value and the second value is less than the threshold value, the electronic device 101 may proceed to operation 660.

In operation 660, the electronic device 101 according to an example embodiment may determine whether a difference between the second value and a third value, which is a pixel value of the camera module 180, is greater than or equal to the threshold value. The pixel value of the camera module 180 may be a value of a plurality of pixels in order to represent an image corresponding to the camera module 180 when the camera module 180 is displayed on the screen on the display 210. For example, the third value may be a brightness value, a saturation value, or a color value of the image corresponding to the camera module 180'. The operation 660 may be performed by the processor 120 or the DDI 230.

In an example embodiment, even when the difference between the first value and the second value based on the change in the image is less than the threshold value, when a difference between the second value after the change in the image is different from the third value which is a pixel value representing the camera module 180 itself is equal to or greater than the threshold value, the electronic device 101 may proceed to operation 670. When the difference between the second value and the third value is less than the threshold value, the electronic device 101 may display a screen on which the image of the first region A1 is not compensated on the display 210.

The electronic device 101 according to an example embodiment may compensate for the first region A1 image in operation 670. For example, the electronic device 101 may compensate for the brightness value, the saturation value, or the color value of the first region A1 image. The electronic device 101 may compensate for the surrounding image such that the camera module 180 matches with the surrounding image based on the situation. For example, the electronic device 101 may compensate for the surrounding image such that the camera module 180 is less visible. The operation 670 may be performed by the processor 120 or the DDI 230.

In an example embodiment, the electronic device 101 may compensate for data displaying the image of the first region A1 among data for displaying the screen. The electronic device 101 may control the DDI 230 to display a compensated image in the first region A1.

Figure 7:
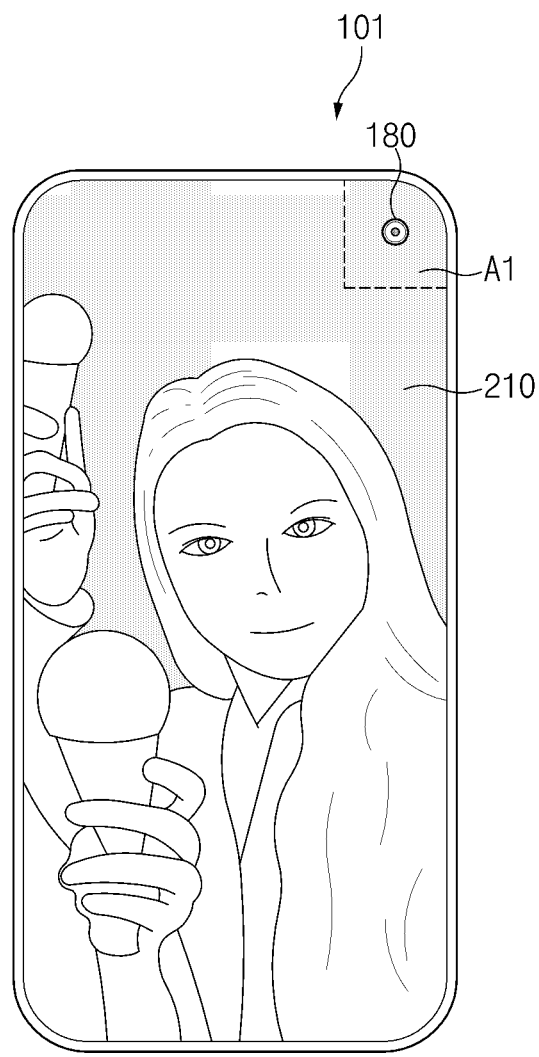
FIG. 7 is a diagram illustrating an example display displaying a screen and a camera module of an electronic device according to an embodiment.
Figure 7:
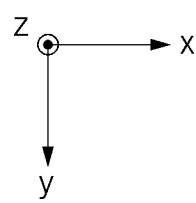

FIG. 7 is a diagram illustrating the display 210 displaying a screen and the camera module 180 of the electronic device 101 according to an embodiment.

In an example embodiment, the full display 210 for displaying the screen on the entire front surface of the electronic device 101 may be applied. The camera module 180 may be disposed on a position overlapping at least a portion of the display 210. The first region A1 in which the camera module 180 is disposed may display the screen of the display 210. The display 210 may display the screen regardless of the camera module 180.

In an example embodiment, a method for reducing heterogeneity occurring between the camera module 180 positioned on the front surface and the image displayed in the first region A1 while substantially fully utilizing the display 210 by displaying the image up to the first region A1 around the camera module 180 is required.

Figure 8:
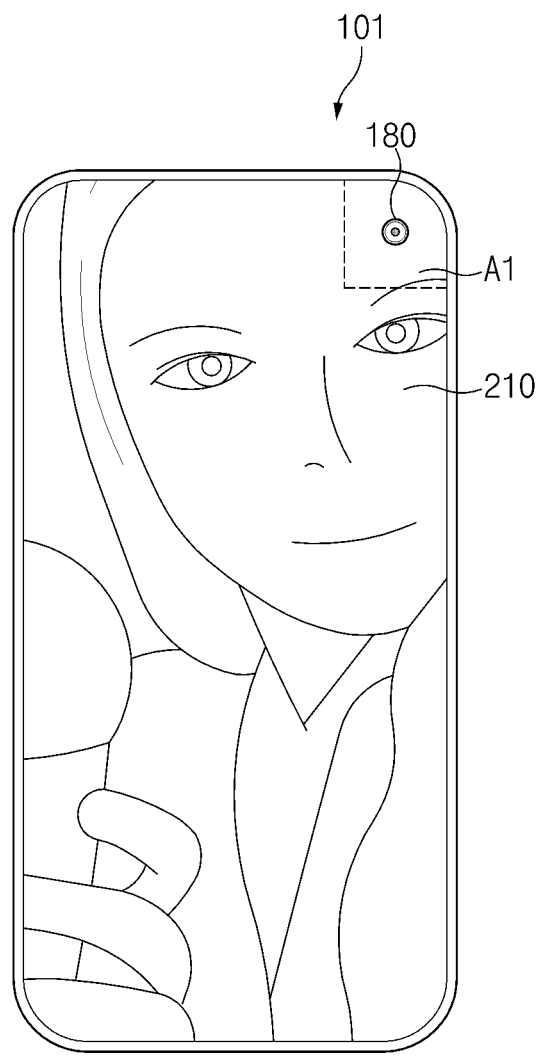
FIG. 8 is a diagram illustrating an example display displaying a zoomed screen of an electronic device according to an embodiment and a camera module.

FIG. 8 is a diagram illustrating the display 210 displaying a zoomed screen of the electronic device 101 according to an embodiment and the camera module 180.

In an example embodiment, hardware positioned on the front surface of the display 210, such as the camera module 180, may be an obstructive element when viewing a video. For example, the user may perform the image enlarging operation via the zoom in. The camera module 180 disposed in the first region A1 around the camera may be recognized as a dot of a subject's face or may act as a factor that interferes with image viewing. In this example, the user may be inconvenienced to move the enlarged image to another region through additional actions.

In an example embodiment, when reducing a degree of disturbance of the camera module 180 when identifying the image in the first region A1, a level of concentration on the screen of the display 210 may increase. To this end, the screen including the image of the first region A1 may be compensated.

Figure 9:
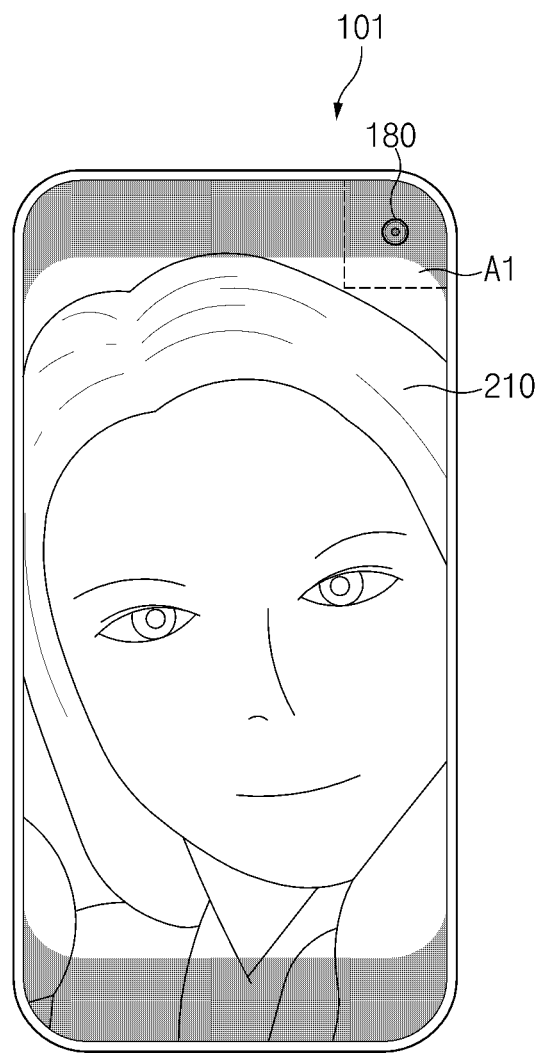
FIG. 9 is a diagram illustrating an example display in which a first region is compensated in a zoomed screen of an electronic device according to an embodiment and a camera module.

FIG. 9 is a diagram illustrating the display 210 in which the first region A1 is compensated in a zoomed screen of the electronic device 101 according to an embodiment and the camera module 180.

In an example embodiment, a vignette effect may be applied on the image around the camera module 180 including the first region A1 on the zoomed screen of the electronic device 101. The vignette effect may refer, for example, to an effect spreading smoothly in a circular or oval shape like a wave from a center portion of the screen to an edge portion thereof. The electronic device 101 may be configured to display the subject in a zoomed state on the screen and to apply the vignette effect on the edge region including the first region A1. The applying of the vignette effect may be performed by the processor 120 or the DDI 230.

In an example embodiment, the electronic device 101 may designate a brightness value, saturation value, or a color value of a portion of the edge region of the display 210 including the first region A1 as a modified value. The modified value may be set based at least some of the brightness value, the saturation value, or the color value of the camera module 180. For example, when the camera module 180 is black, the electronic device 101 may compensate for the portion of the edge region of the display 210 including the first region A1 to have low brightness, low saturation, or a dark color such as black or dark gray. In this case, the camera module 180 may be less visible by the vignette effect.

Figure 10:
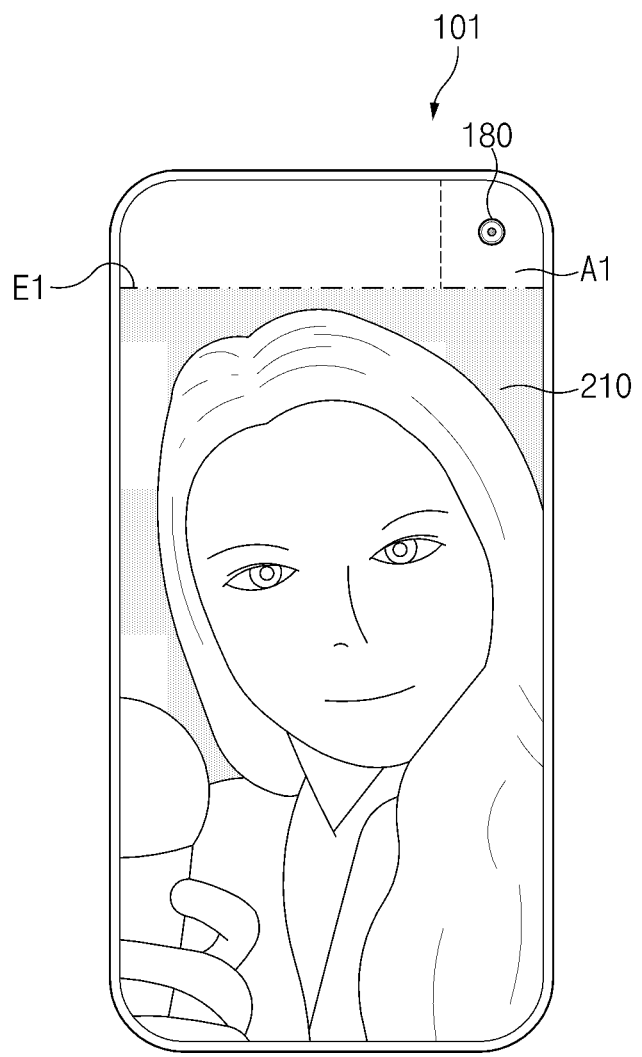
FIG. 10 is a diagram illustrating an example display in which a first region is compensated in a zoomed screen of an electronic device according to another embodiment.
Figure 10:
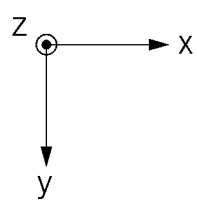

FIG. 10 is a diagram illustrating the display 210 in which the first region A1 is compensated in a zoomed screen of the electronic device according to another embodiment and the camera module 180.

In an example embodiment, a region where an image is displayed on the zoomed screen of the electronic device 101 may be limited by a first boundary E1. For example, when the image is enlarged, the region displaying the image may be limited in the Y-axis direction from the first boundary E1. The image may be displayed only below a position where the camera module 180 is disposed in the display 210. The operation of limiting the region where the image is displayed with respect to the first boundary E1 may be performed by the processor 120 or the DDI 230.

In an example embodiment, the region where the display 210 is disposed may be extended over the first boundary E1 to utilize the display 210 as wide as possible. In order to focus on the image, hardware elements on the front surface such as the camera module 180 may be hidden. For example, when a difference in colors of pixel values is equal to or greater than a threshold value, a portion around the camera module 180 including the first region A1 may be artificially covered.

In an example embodiment, the user may prefer to view an image on the zoomed screen where the other components are not visible rather than an image on which the screen itself is large. The processor 120 of the electronic device 101 may be configured to limit a display region displaying an image on the display 210 below the first boundary E1 based on a user's setting.

Figure 11:
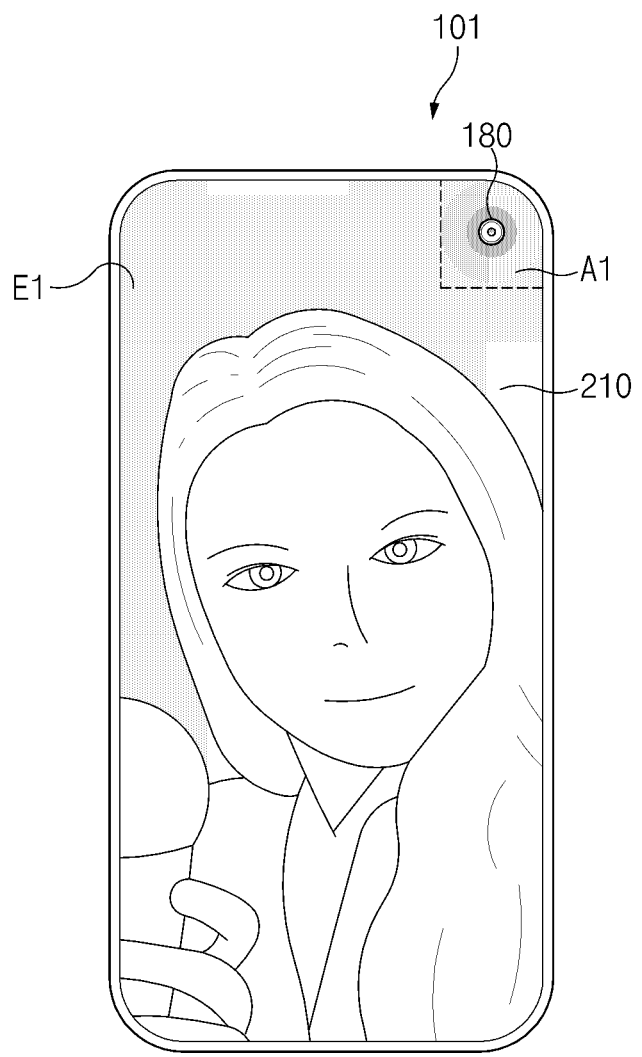
FIG. 11 is a diagram illustrating an example display in which a first region is compensated in a zoomed screen of an electronic device according to another embodiment and the camera module.
Figure 11:
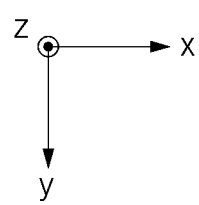

FIG. 11 is a diagram illustrating the display 210 in which the first region A1 is compensated in the zoomed screen of the electronic device 101 according to another embodiment and the camera module 180.

In an example embodiment, a blur effect may be applied on the image around the camera module 180 including the first region A1 in the zoomed screen of the electronic device 101. The blur effect may refer, for example, to an effect making a boundary on the image unclear, making the image to change gradually, or blurring image. The electronic device 101 may designate a brightness value, a saturation value, or a color value of the first region A1 as a modified value. For example, the electronic device 101 may set the brightness value, the saturation value, or the color value to gradually change from the camera module 180 to an edge of the first region A1 to apply the blur effect. In this example, the camera module 180 may be less visible by the blur effect. The applying of the blur effect may be performed by the processor 120 or the DDI 230.

As in the various example embodiments illustrated in FIGS. 9 to 11, the first region A1 may be compensated in the zoomed screen of the electronic device 101 to reduce visibility of components such as the camera module 180 when viewing the screen on the display 210. Accordingly, the level of concentration on the image may be increased by reducing a degree to which hardware components such as the camera module 180 cover the image or obstruct the screen viewing.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, etc. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various example embodiments disclosed in the disclosure, the disturbance of the viewing of the screen by the camera module or the sensor module may be reduced.

Further, according to embodiments disclosed in the disclosure, the display may be disposed up to the region of the front surface of the electronic device in which the camera module or the sensor module is disposed, thereby displaying the screen having an extended size.

In addition, various effects, directly or indirectly understood through this document, may be provided.

While the disclosure has been illustrated and described with reference to various example embodiments thereof, it will be understood by those skilled in the art that various changes in form and details may be made therein without departing from the spirit and scope of the disclosure as defined, for example, by the appended claims and their equivalents.

What is claimed is:

1. An electronic device comprising:
   a display, comprising a matrix of pixels, configured to display a screen;

a display driver circuit configured to receive video information to control the display to display the screen;
a module comprising at least one of a camera or a sensor disposed in a first region of the display, the first region comprising a first portion with an absence of pixels and a second portion comprising pixels, the first portion being an interruption in the matrix where pixels are not present and is overlapped with the module, the second portion surrounding the first portion; and
at least one processor operatively connected with the display driver circuit and the module,
wherein at least one of the at least one processor or the display driver circuit is configured to compensate for an image displayed in the first region based on a change in the image of the first region of the screen or a pixel value of the first region, such that the module matches with the image displayed in the first region or such that the module is less visible, so as to reduce disturbance of displayed images due to the presence of the module in at least the first portion with the absence of pixels and reduce a degree of disturbance when identifying the image displayed in the first region.

2. The electronic device of claim 1, wherein the change in the image of the first region includes a change in the screen displayed on the display by a user.

3. The electronic device of claim 1, wherein the change in the image of the first region includes a change in a pixel value of the image displayed in the first region by an image-related program.

4. The electronic device of claim 1, wherein the pixel value of the first region includes one or more of a brightness value of the image displayed in the first region, a saturation value of the image displayed in the first region, or a color value of the image displayed in the first region.

5. The electronic device of claim 1, wherein the at least one processor is configured to control the electronic device to:
extract the pixel value of the first region as a first value;
determine whether the change in the image of the first region is detected; and
extract a pixel value of the first region as a second value based on the change in the image of the first region being detected.

6. The electronic device of claim 5, wherein the at least one processor is configured to control the electronic device to determine whether a difference between the first value and the second value is greater than or equal to a threshold value.

7. The electronic device of claim 6, wherein the at least one processor is configured to control the electronic device to determine whether a difference between the second value and a third value is greater than or equal to the threshold value, wherein the third value includes a pixel value corresponding to the module.

8. The electronic device of claim 1, wherein the at least one processor is configured to control the electronic device to compensate for the image displayed in the first region using both the change in the image of the first region and the pixel value of the first region.

9. A method for compensating for an image around a camera module of an electronic device in which the camera module is disposed in a display for displaying a screen, the method comprising:
executing an image-related program;
extracting a pixel value of a plurality of pixels in a first region around the camera module as a first value;
determining whether a change in output of the image in the first region is detected after the first value is extracted;
extracting a pixel value of the plurality of pixels in the first region around the camera module as a second value based on the change in the image being detected;
determining whether a difference between the first value and the second value is greater than or equal to a threshold value; and
compensating for the image of the first region after determining the change in the output of the image and when the difference between the first value and the second value is greater than or equal to the threshold value.

10. The method of claim 9, further comprising:
determining whether a difference between the second value and a third value is greater than or equal to the threshold value, the third value being a pixel value corresponding to the camera module, based on the difference between the first value and the second value being than the threshold value,
wherein the image of the first region is compensated based on the difference between the second value and the third value being greater than or equal to the threshold value.

11. The method of claim 9, wherein the determining whether the change in the image is detected includes:
identifying the change in the image of the first region from a change in the screen displayed on the display by a user.

12. The method of claim 11, wherein the change in the image is based on performing a zoom in function of enlarging some regions of the screen or some images displayed on the display, and
wherein the image is compensated such that the camera module is less visible compared to no compensation being performed.

13. The method of claim 9, wherein the determining whether the change in the image is detected includes:
identifying a change in the pixel value of the image displayed in the first region by the image-related program.

14. The method of claim 13, wherein the threshold value is set to a pixel value that disturbs a view of the screen by the camera module after the change in the image.

15. The method of claim 9, wherein the pixel value of the first region includes one or more of a brightness value of the image displayed in the first region, a saturation value of the image displayed in the first region, or a color value of the image displayed in the first region.

16. An electronic device comprising:
a display configured to display a screen, the display including a first region and a second region different from the first region;
a display driver circuit configured to receive video information to control the display to display the screen;
a camera module comprising a camera disposed in the first region of the display, the first region comprising a first portion with an absence of pixels and a second portion comprising pixels, the first portion being an interruption in a matrix of pixels of the display where pixels are not present and corresponding to positioning of the camera module; and
at least one processor operatively connected with the display driver circuit and the camera module,
wherein the at least one processor or the display driver circuit is configured to control the electronic device to compensate for the first region to reduce a degree of visibility of the camera module, wherein the electronic device is configured to at least one of:

apply a vignette effect on an image at a specified region extending along at least one edge of the display and a specified region surrounding the camera module including the first region on the screen, or limit a region where an image is displayed on the screen by a first boundary that excludes the camera module and a portion of the second region of the display.

17. The electronic device of claim 16, wherein the electronic device is configured to apply a blur effect on an image within a specified region of the camera module including the first region on the screen.

18. The electronic device of claim 16, wherein a brightness value, a saturation value, or a color value of the screen including at least a portion of the first region is a modified value, and wherein the modified value is set based on at least some of a brightness value, saturation value, or a color value of the camera module.

* * * * *